2,993,055
8-TERT-BUTYL-1,4-DIOXASPIRO[4.5]-DECANE
Henry E. Hennis, Midland, and Earl H. Rosenbrock, Auburn, Mich., assignors to The Dow Chemical Company, Midland, Mich., a corporation of Delaware
No Drawing. Filed Oct. 2, 1958, Ser. No. 764,767
1 Claim. (Cl. 260—340.9)

This invention relates to an organic compound useful as an ingredient in a scent composition and a method of preparing this material. More particularly, the invention relates to 8-tert-butyl-1,4-dioxaspiro[4.5]decane having the structural formula:

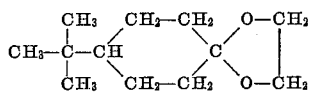

This new compound is an oily liquid, soluble in most organic solvents and substantially insoluble in water. The compound has been tested and found useful in the art of perfumery for imparting wool, earthy, musk and labdanum notes to perfumes, soaps, cosmetics, antiseptics and the like. It is also useful as an essential ingredient in the preparation of a synthetic patchouli oil.

8-tert-butyl-1,4-dioxaspiro[4.5]decane is readily prepared by contacting 4-tert-butylcyclohexanone and ethylene glycol in the presence of a catalyst suitable for the formation of acetals. Such suitable catalysts are, for example, hydrochloric acid, glacial acetic acid, sulphuric acid, p-toluenesulphonic acid, calcium chloride, ammonium chloride and boron trifluoride. The reaction may be carried out at a temperature between about 0° and about 200° C., but preferably between 50° and 150° C. and desirably in the temperature range of 65° to 125° C. At lower temperatures the reaction rate becomes slow, while at higher temperatures undesirable side reactions may take place, thus reducing the yield of the desired product. It is convenient, but not essential to use a solvent for the reaction mixture. Water is formed during the course of the reaction and should be removed as it is formed, if the maximum yield of acetal is to be obtained. Toluene is a convenient solvent to use because of its formation of an azeotrope with water and the mutual solubility characteristics. By distilling the azeotrope during the reaction, the water is readily removed as formed. Other solvents may be employed, however, such as, for example, benzene, xylene, petroleum ether, carbon tetrachloride, and the like. The desired product, 8-tert-butyl-1,4-dioxaspiro[4.5]decane, may be readily separated by distillation.

The following examples illustrate the invention, but are not to be construed as limiting the invention thereto.

EXAMPLE I

According to one method of the present invention, 8-tert-butyl-1,4-dioxaspiro[4.5]decane is prepared in the following manner:

A 2-liter, round-bottomed flask was fitted with an agitator, reflux condenser, Bidwell and Sterling distilling receiver, thermometer and dropping funnel; 454 grams (2.95 moles) of 4-tert-butylcyclohexanone, 1 liter of toluene and 10 grams of p-toluenesulphonic acid were added to the flask. The temperature of the flask and contents was raised to 100° C. While maintaining agitation, 365 grams of ethylene glycol were added dropwise. After the addition of ethylene glycol had been completed, the reaction mixture was maintained at 100° C. until water was no longer collected in the distilling receiver. There was thus removed 52.5 grams of water (2.92 moles) indicating that the reaction had proceeded to 99 percent completion. The reaction mixture was then cooled to 30° C. and 400 milliliters of a 5 percent solution of sodium bicarbonate in water was added to neutralize the p-toluenesulphonic acid. Toluene was removed from the reaction mixture by distillation under a pressure of 50 to 75 millimeters of mercury absolute and the remaining crude product was purified by distillation under a pressure of 0.4 millimeter of mercury absolute. There was thus obtained 506 grams (87 percent of the theoretical yield based on 4-tert-butylcyclohexanone) of 8-tert-butyl-1,4-dioxaspiro[4.5]decane, as a colorless liquid having an index of refraction, $n_D^{25}$, of 1.4634, a specific gravity $\frac{25}{15.5}$, of 0.972 and boiling over the range 65° to 67° C. under a pressure of 0.4 millimeter of mercury absolute.

EXAMPLE II

The foregoing Example I was repeated with the exception that 10 grams of glacial acetic acid was used instead of 10 grams of p-toluenesulphonic acid. In this case, 97 percent of the theoretical yield (based on 4-tert-butylcyclohexanone) of 8-tert-butyl-1,4-dioxaspiro[4.5]-decane was obtained.

EXAMPLE III

*Synthetic patchouli oil*

The following materials were blended together in the designated proportions:

| | Parts by weight |
|---|---|
| 4-tert-butylcyclohexanone | 1 |
| 2-sec-butylcyclohexyl acetate | 2 |
| 3-isobutyl-5-methyl-3-hexen-2-one | 2 |
| 4-tert-butylcyclohexanol | 3 |
| 8-tert-butyl-1,4-dioxaspiro[4.5]decane | 2 |

Synthetic patchouli oil prepared in this manner was found to be a very satisfactory replacement for the natural patchouli oil. However, proportions are not highly critical and may be varied by a factor of plus 100 percent and minus 50 percent. Thus, a blend containing ½ to 2 parts by weight of 4-tert-butylcyclohexanone, 1 to 4 parts by weight of 2-sec-butylcyclohexyl acetate, 1 to 4 parts by weight of 3-isobutyl-5-methyl-3-hexen-2-one, 1½ to 6 parts by weight 4-tert-butylcyclohexanol, and 1 to 4 parts by weight 8-tert-butyl-1,4-dioxaspiro[4.5]decane is a satisfactory patchouli oil substitute.

In a manner similar to Example III, synthetic substitutes for oakmoss, musk, labdanum may be compounded utilizing the compound of the present invention.

Various modifications may be made in the present invention without departing from the spirit or scope thereof, and it is understood that we limit ourselves only as defined in the appended claim.

We claim:
8-tert-butyl-1,4-dioxaspiro[4.5]decane having the formula:

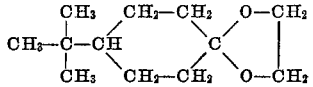

(References on following page)

References Cited in the file of this patent

UNITED STATES PATENTS

| | | |
|---|---|---|
| 1,882,200 | Steimmig | Oct. 11, 1932 |
| 2,095,320 | Dreyfus | Oct. 12, 1937 |
| 2,265,437 | Luthy | Dec. 9, 1941 |
| 2,730,529 | Gatzi | Jan. 10, 1956 |
| 2,861,080 | Petrie | Nov. 18, 1958 |

FOREIGN PATENTS

| | | |
|---|---|---|
| 546,650 | Canada | Sept. 24, 1957 |
| 747,423 | France | Mar. 28, 1933 |
| 595,963 | Great Britain | Dec. 23, 1947 |
| 754,968 | Great Britain | Aug. 15, 1956 |
| 802,022 | Great Britain | Sept. 24, 1958 |

OTHER REFERENCES

Backer: Rec. Trav. Chim., vol. 55, p. 1038 (1936).